United States Patent [19]
Shnell

[11] Patent Number: 5,911,684
[45] Date of Patent: *Jun. 15, 1999

[54] SYSTEM FOR GEOTHERMAL PRODUCTION OF ELECTRICITY

[76] Inventor: James H. Shnell, 1371 Smokewood Dr., Santa Ana, Calif. 92705

[*] Notice: This patent is subject to a terminal disclaimer.

[21] Appl. No.: 08/919,380

[22] Filed: Aug. 29, 1997

Related U.S. Application Data

[63] Continuation-in-part of application No. 08/486,704, Jun. 7, 1995, Pat. No. 5,697,218, and application No. 08/650,595, May 31, 1996, Pat. No. 5,661,977.

[51] Int. Cl.$^6$ ........................................... F03G 7/00
[52] U.S. Cl. ........................ 60/641.2; 60/659; 422/212
[58] Field of Search .................... 60/641.2, 652, 60/659, 39.5, 731; 422/212

[56] References Cited

U.S. PATENT DOCUMENTS

| | | |
|---|---|---|
| 3,858,397 | 1/1975 | Jacoby . |
| 4,002,729 | 1/1977 | Abraham et al. . |
| 4,085,795 | 4/1978 | Gill . |
| 4,192,371 | 3/1980 | Derouette et al. . |
| 4,372,386 | 2/1983 | Rhoades et al. . |
| 4,927,856 | 5/1990 | Elion . |
| 4,937,052 | 6/1990 | Takahashi et al. . |
| 5,052,482 | 10/1991 | Gondouin . |
| 5,202,194 | 4/1993 | VanBerg, Jr. . |
| 5,255,740 | 10/1993 | Talley . |
| 5,661,977 | 9/1997 | Shnell ................................ 60/641.2 |
| 5,697,218 | 12/1997 | Shnell ................................ 60/641.2 |

FOREIGN PATENT DOCUMENTS

| | | |
|---|---|---|
| 0511180A1 | 10/1992 | European Pat. Off. . |
| 59-222225 | 12/1984 | Japan . |
| 60-035182 | 2/1985 | Japan . |
| 63-032110 | 2/1988 | Japan . |
| 63-084629 | 4/1988 | Japan . |
| 2058935 | 4/1981 | United Kingdom . |

OTHER PUBLICATIONS

PCT International Search Report for PCT/US96/09522 dated Sep. 26, 1996 (3 pages).

*Primary Examiner*—Hoang Nguyen
*Attorney, Agent, or Firm*—Knobbe, Martens, Olson & Bear LLP

[57] ABSTRACT

A system for the generation of electricity from geothermal energy that is less expensive, more efficient, and avoids dealing with undesirable byproducts, is disclosed. The system of the present invention relies on using endothermic reactions at the bottom of a well to capture and store the geothermal heat, and exothermic reactions at the top of the well to release the heat stored within the products of the endothermic reactions. In the preferred embodiment, the endothermic reaction is the dehydrogenation of ethanol. To induce the endothermic reaction as well as to harvest and separate the resulting products, a catalytic device is used where each type of product selectively diffuses into its individual conduit. The endothermic products undergo the exothermic reaction in a combustion turbine, and the products of the exothermic reaction are immediately condensed in a condenser. In the preferred embodiment the condenser condenses ethanol vapor into a liquid to be returned down the well, thus creating a closed system.

34 Claims, 8 Drawing Sheets

SYSTEM FOR GEOTHERMAL PRODUCTION OF ELECTRICITY

This application is a continuation-in-part of application, Ser. No. 08/486,704 filed Jun. 7, 1995 now U.S. Pat. No. 5,697,218 and of Ser. No. 08/650,595, filed May 31, 1996, now U.S. Pat. No. 5,661,977.

FIELD OF THE INVENTION

This invention relates to the production of electricity by the use of geothermal heat. Geothermal heat acts on a device at the bottom of a well and induces an endothermic reaction where the products of the endothermic reaction are brought to the surface and undergo an exothermic reaction for providing energy to be converted to electricity.

BACKGROUND OF THE INVENTION

Current systems for the production of electricity from geothermal energy rely on the heat in the earth's crust to vaporize water or another liquid; the vapor is then used in a turbine to generate electricity. The geothermal heat is generally brought to the surface via wells that tap into reservoirs of steam or brine that circulate at depths in the crust sufficient to collect a substantial amount of heat. See U.S. Pat. No. 3,786,858 (1974), for example.

However, modern steam turbines operate most efficiently at very high temperatures, substantially higher than the temperatures achieved in the steam or brine reservoirs generally used to produce geothermal electricity. The heat that is present at depths within the earth that are attainable (for practical purposes) is not sufficiently concentrated. Geothermally-powered steam turbines are therefore less efficient. They are also somewhat limited in operation by the fact that the heat removed from the earth cannot be stored for later use; it must be used immediately or lost.

In addition, the brine or steam that is brought to the surface loses a significant amount of its heat (generally 25% to 30%) as it comes to the surface. Brine or steam from geothermal reservoirs is generally accompanied by hydrogen sulfide and other undesirable gases, which must be captured before they escape into the atmosphere. Because the temperature of the brine or steam is relatively low, a large amount must be transported to the surface, and so large-diameter wells, which are expensive to drill, are required. Moreover, the brine and steam that is brought to the surface is often highly mineralized and corrosive. If it is used directly in a turbine, the turbine must be modified to withstand these conditions, which further deceases the efficiency of the system. In the alternative, the brine or steam may be used both directly and to boil another fluid through a heat exchanger in a binary generating system. These alternatives also lose some efficiency through the heat exchanger.

Another problem that can be caused by the minerals in the brine or steam is scaling in the wells, which can build up over time and must be removed. The brine presents problems of disposal after it has been used, unless it is reinjected into the reservoir, which requires expensive pumping and may contaminate the reservoir. Even if the brine is reinjected, some of the salts may drop out of solution as the brine is cooled prior to reinjection; these salts must be disposed of, and they may be radioactive or otherwise hazardous.

The most significant limitation, however, is that there are very few reservoirs that are both large enough and hot enough to make geothermal exploitation an economical prospect, and so the conventional method for geothermal production of electricity is very limited in application.

Research is currently being conducted into the possibility of drilling into hot, dry rock ("HDR") and injecting water to create a geothermal reservoir which can then be tapped to generate electricity; however, such systems face many of the same problems as conventional geothermal systems, and are more expensive. Prior art HDR systems require two wells to be bored, an injection well for injecting the water to create a reservoir, and a separate production well for continuously bringing the steam to the surface. Employing only one well for injecting water and retrieving steam would not be efficient since either too much energy would be lost when the injected water passes the rising steam, or the steam would be retrieved only intermittently so that energy would not be supplied to the generator on a continuous basis.

The injection of water into the rock requires an amount of energy that represents a significant fraction of the energy that the system can produce, thus lowering the efficiency of the system. Also, a certain percentage of the water that is injected is lost into fractures in the rock, and is not returned up the production well. The greater the amount of pressure that is used to drive the water from the injection well to the production well, the more water is lost, because higher pressure at the injection well causes the cracks to dilate there, as does the colder water, which causes the rock to contract. The dilation is needed at the production well, where it accelerates the release of the energy in the rock. Tests have shown that short-term shutting-in of the production well, by increasing dilation there, improves overall production from the well. Although subterranean reservoirs of magma achieve even higher temperatures than hot, dry rock or reservoirs of steam or brine, current geothermal systems are not capable of tapping directly into magma.

The predominant technology used for the generation of electricity is the combustion of hydrocarbons and the conversion of the resultant heat to electricity. Up until the last decade, most electricity was generated by the combustion of coal to produce steam. Recently, approximately half of all new electric generating capacity has taken the form of combustion turbines burning oil or natural gas and using the power to create electricity through a direct link to a generator. In a system using a "combined cycle," the heat from the combustion turbine exhaust is used to create steam, which then generates additional electricity in a steam turbine. However, each of the foregoing combustion processes releases substantial amounts of nitrogen oxides, creating air pollution and the potential for acid rain. They also produce carbon dioxide, thus contributing to global warming. If coal or oil is used as the fuel, sulfur dioxide is also released into the atmosphere, which may produce additional acid rain, and particulates may be released as well. The combustion of coal also produces ash, which must be disposed of properly. Moreover, these processes all consume limited natural resources. Also, a combustion turbine uses a significant amount of the energy it creates to compress the air that it takes in, in order to sustain its operation.

Other technologies used to produce electricity include nuclear, hydroelectric, solar and wind generation. Nuclear generation is expensive and presents serious issues of disposal and contamination. Hydroelectric, solar and wind generation face timing and geographic limits in terms of the areas in which they are effective and may require extensive collection systems or otherwise involve environmental impacts. Also, solar and wind generation are significantly more expensive than conventional technology.

Much of the electricity currently produced is generated by condensing steam turbines; fuel is combusted and the exhaust is released into the atmosphere, while the heat produces superheated steam. The steam passes through a steam turbine generator, generating electricity, at the end of which the steam is condensed. The drop in pressure due to condensation at the outlet end of the turbine permits the turbine to turn more freely, but the overall process is still less than forty percent efficient, in part due to the need to exchange the combustion heat into steam energy. Also, a significant amount of energy is lost through the exhaust of the combustion process.

A steadily increasing portion of new generating capacity installed in recent years is in the form of combustion turbines. Combustion turbines use the energy released from combustion to turn the shaft on a turbine, which then turns an electrical generator. The turbine requires a large volume of air for the combustion, which requires filtering and, often, heating or cooling, and introduces dirt into the turbine. The exhaust is released into the atmosphere, and it carries a significant amount of energy as well as pollution with it. In addition, a combustion turbine uses a significant amount of energy to compress the inlet air, only 16% of which is oxygen used in the combustion process.

Only recently have combustion turbines achieved efficiencies approximating 40% while thus operating in "simple cycle." Efficiencies approximating 50% can be achieved by combustion turbines operating in "combined cycle," in which the heat of the exhaust from the combustion turbine is exchanged into steam energy, which is then used to operate a steam turbine generator. This steam is not, however, as superheated as the steam that is ordinarily used in steam turbine generators and consequently the steam cycle of a combined cycle system is less efficient than a simple steam turbine.

The steam turbine and the combustion turbine (whether simple cycle or combined cycle) each cause pollution due to the release of products and byproducts of combustion into the atmosphere. They each lose efficiency because they release as exhaust a significant amount of the energy from the combustion. The steam generator and the combined cycle combustion turbine generator each lose efficiency due to the exchange of heat into steam pressure.

SUMMARY OF THE INVENTION

The present invention is a system for the efficient generation of electricity from geothermal energy wherein one or more substances is transported down a well to a depth at which geothermal heat (whether from brine or steam reservoirs or hot, dry rock or magma) is sufficient to cause an endothermic reaction to occur among such substances. The reaction products are then transported separately to the surface, where the products undergo the reverse reaction, and energy from this exothermic reaction is converted into electrical energy, whether through a steam turbine, a combustion turbine, or a combination of the two. Alternatively, a fuel cell might take the place of the turbine(s).

The endothermic reaction at the bottom of the well may proceed slowly, at a relatively low temperature, with the products being created and collected over a large area; the exothermic reaction will proceed rapidly, producing a high temperature, thus effectively concentrating the geothermal heat to make the production of electricity more efficient. In a preferred embodiment of the present invention, a catalytic device is used having one or more conduits, such as tubes or porous rods, for collecting one or more of the products of the endothermic reaction and transporting such product separate from the other product(s). The conduits may be nested inside a ceramic material permeable to the products, in which the ceramic material is surrounded by a thin film or mesh of a catalyst (a zeolite, for example). Although the injected endothermic reactant automatically undergoes the endothermic reaction upon exposure to the heat at the bottom of the well, the use of a catalyst on the surface of the catalytic device is desirable to accelerate the reaction. The tubes or conduits have a cross-sectional configuration that is effective for collecting the intended products.

One conduit or set of conduits is made from a material which is permeable to one of the products of the endothermic reaction, but which is not permeated by or which repels (chemically, by higher pressure, or otherwise) the other product(s) of the endothermic reaction as well as the reactant (s). Another conduit or set of conduits receives the remaining product(s). The tubes are assembled in a fashion to promote the separation of the products by absorbing them upon formation on the surface of the catalyst. In the simplest form, the catalytic device is a conduit composed of a catalyst that is permeable to only one of the products. The other products and remaining reactants, if any, would return from the bottom of the well by a separate conduit. In another embodiment, the catalyst is porous as to all products of the endothermic reaction. A selective material that is porous to only one product surrounds the tubes or porous conduits that are closest to the surface of the catalyst, so that such product is removed from the catalyst; the innermost tube or porous conduit will collect the remaining product. If the dehydrogenation of ethanol into ethylene oxide and hydrogen is the desired endothermic reaction, the catalyst may be a suitable transition metal such as copper or palladium, for example. The catalyst material is a thin film or mesh surrounding the porous ceramic material in which the conduits for the products are embedded. In one embodiment, a series of outer conduits absorb hydrogen, and an inner conduit absorbs ethylene oxide. The inner conduit may be simply a hole in the porous ceramic material through which the ethylene oxide diffuses. The series of conduits for receiving exclusively hydrogen may, for example, be made from palladium or other material which is porous enough to allow hydrogen to pass through, but not ethylene oxide.

The optimal design for a particular catalytic device will depend on the nature of the endothermic reaction, its reactant(s) and products, the nature of the catalyst used, and the conditions under which the reaction occurs. The preferred embodiment of the present invention utilizes the dehydrogenation of ethanol into hydrogen and ethylene oxide, and the corresponding exothermic reaction, providing energy outside of the well, is the hydrogenation of ethylene oxide into ethanol.

If the well is drilled into a zone where the conditions are such that the amount of heat available is not the limiting factor, the rate of the reaction can be increased by increasing the surface area of the catalyst on the catalytic device. This can be achieved without lengthening the well by constructing the catalytic device so that it is fluted or ridged, either longitudinally or circumferentially, rather than being a simple cylinder.

The conduits for the endothermic products are preferably placed within the well, so that they are surrounded by the reactant flowing down the well. As a result, the endothermic products are cooled as they rise, but the heat is not wasted. Instead, it "pre-heats" the reactant as it flows toward the catalytic device. In the preferred embodiment, the endothermic product (such as ethylene oxide) is chilled as it leaves the top of the well, in order to condense it outside of the well, but such a step would not be practical if hydrogen were the endothermic product, for example. The resulting decrease in pressure at the top of the well decreases the likelihood that the product condenses inside the well, which it might otherwise do as a result of cooling as it rises, and thus helps to accelerate the flow of the product up the well.

A catalytic device constructed in accordance with the present invention promotes the endothermic reaction and, simultaneously, collects and separates the products of that reaction. The system of the present invention has a mechanism for collecting the products of the endothermic reaction in order to transport them to the top of the well. The present invention collects the products and, at the same time, preferably segregates them in order to preclude unwanted reactions between the products or between a product and some other material.

Electricity generating systems constructed in accordance with the invention offer advantages over existing generating technologies. The primary advantage over existing geothermal systems is that the system of the present invention absorbs a greater amount of heat per unit volume through the endothermic reaction than can be captured by heated brine or steam. For example, the decomposition of a given mass of water captures five to six times the amount of heat that is represented by the same mass of steam. Also, higher temperatures (and therefore greater efficiency) can be obtained in the exothermic reaction and the generation of electricity.

In addition, since brine is not required by the invention, the use of geothermal energy to generate electricity by way of the present invention is not limited to those locations having economically viable subterranean reservoirs of heated brine. Since brine is not required, no efficiency need be lost to heat exchangers in order to avoid mineral deposits in the generating mechanism. So long as the products of the endothermic reaction are kept separated, none of the energy gained at the bottom of the well is lost in bringing the energy to the surface. The products of the reactions are not corrosive to the equipment. No toxic gases are typically released to the atmosphere. The products of the endothermic reaction convey the energy in a much smaller volume, and therefore the borehole drilled for creating the well may have a much smaller diameter and so is less expensive to bore. In addition, only one well is required instead of two since the endothermic reactant does not react with the endothermic products that are drawn up through separate conduits within the well. If the well is drilled into hot, dry rock, its effectiveness in gathering heat is likely to be limited, since it will be in direct contact with only a limited amount of rock, and rock is not highly effective at conducting heat. Accordingly, the well may not be effective in collecting heat from bodies of hot, dry rock that are more than a short distance from the well casing. One way to address this problem is to open up fracture zones in the rock, which are then filled with a medium that carries the surrounding heat to the well more effectively than would the solid rock. One such medium is water, if the water can circulate within the fracture zone and carry the heat by convection. If water is not an effective medium, another substance having a greater propensity for carrying the heat under the conditions existing in the fracture zone, whether by conduction or convection, can be injected into the fracture zone. Whether water or another substance is used, any substance that differs from the endothermic reactant in the well requires a separate conduit within the well to carry it to the point(s) at which it is injected. Since any injection of water will be made at the "production" well, much of the pumping energy used in the prior art to force the water from the injection well through the fractures to the production well is saved. In addition, water loss into the rock is lower, and well performance should be improved in the manner indicated by the shutting-in tests of existing geothermal production wells.

Moreover, mineral deposits do not build up and present problems in the well. The reinjection or disposal of the brine is not required. To the extent that the endothermic reaction is (on a net basis) the dehydrogenation of ethanol, no pollution is created, let alone released into the atmosphere, and there is no waste of limited resources. The products of the endothermic reaction can be stored and used when electricity is needed. If the products of the endothermic reaction come out of the ground at high pressure, they can be stored and used at high pressure, decreasing or avoiding the need to compress them prior to the exothermic reaction (a step that requires significant energy in combustion turbines) or, if the exothermic reaction does not require compression, the excess pressure from the well can be used to generate additional energy.

The preferred embodiment of the present invention also comprises the combination of a "combustion" turbine fueled by two or more reactants that combine in an exothermic reaction, the product(s) of which can be condensed, and a condenser. In the preferred embodiment, the reactants are hydrogen and ethylene oxide which are produced by the endothermic reaction at the bottom of the well. The hydrogen reacts with the ethylene oxide to create ethanol. Following the final power stage in which the exothermic reaction is harnessed by the "combustion" turbine, the product(s) of the exothermic reaction is/are condensed, thus reducing the amount of back-pressure on the combustion turbine and increasing its efficiency. In the preferred embodiment of the present invention, the exothermic reaction is the hydrogenation of ethylene oxide into ethanol. Although this reaction is highly exothermic, it does not achieve very high temperatures under normal circumstances, nor does it proceed rapidly under standard conditions. Accordingly, a compressor stage may be required to ensure that the hydrogen is fed to the turbine at an elevated pressure, which favors the reaction. In addition, the "combustion chamber" of the turbine will instead take the form of a reaction chamber, in which long, thin plates (or other forms, as appropriate) of an effective catalytic material are placed in such a manner as to maximize the reaction rate of the exothermic reaction, while obstructing the fluid flow through the turbine as little as possible.

If the exothermic reaction employed by the combination turbine is the hydrogenation of ethylene oxide, the temperature that can be achieved in the turbine is the maximum temperature at which the exothermic reaction proceeds efficiently under the pressure and other conditions inside the turbine, which may be 500° C. or less. In order to maximize the temperature differential created by the exothermic reaction (and therefore the effectiveness of the turbine), the reactants that are fed into the turbine (ethylene oxide and hydrogen) may be cooled. The ethylene oxide will be cooled to (or below) the temperature at which it becomes a liquid (in order that it can be injected as a fuel that occupies a minimal initial volume).

The optimal temperatures for introducing the exothermic reactants into the turbine may be lower than the temperature at which the exothermic reaction proceeds rapidly, even in the presence of the catalyst. In order to achieve the necessary temperature at the point at which the exothermic reaction begins, it may therefore be necessary to embed heating elements in and downstream from the leading edges of the catalytic elements. The heating elements raise the temperature of the surface of the catalytic elements so that the temperature of the exothermic reactants, at the point at which the exothermic reaction begins, is at the optimal level. In a preferred embodiment, the heat for these heating elements is captured from the exhaust of the turbine, and conveyed back to the heating elements. Areas of the catalytic elements that are further downstream, where the heat released by the exothermic reaction has raised the ambient temperature to an adequate level, do not need such heating elements embedded in them.

The preferred combination turbine is fueled with hydrogen and ethylene oxide, the reaction of which produces ethanol vapor, to be condensed at the outlet end of the turbine. Such a combination turbine can be used as a part of the system of the present invention or operate on other fuel sources. Alternatively, the system of the present invention can also employ either a standard combustion turbine or a boiler combined with a steam turbine or a fuel cell.

Combination turbines constructed in accordance with the invention offer several advantages. By condensing the product(s) of the exothermic reaction, the combination turbine reduces the back-pressure of the exhaust from the combustion turbine and increases the pressure drop across the final combustion stages of the turbine. Advantageously, the power turbine section of the combination turbine generally has more power stages than the power turbines of prior art combustion turbines, thus harnessing more of the energy from the exothermic reaction and increasing the efficiency of the turbine and simultaneously making it easier to condense the steam at the outlet of the turbine. In addition, the combination turbine will not require a heat exchanger to generate steam for its primary cycle, thus increasing its efficiency. To the extent that condensation creates a "closed loop" (i.e., all of the product(s) are condensed or otherwise captured) it will be possible to make productive use of some of the energy that is otherwise lost with the exhaust, thus further increasing efficiency. To the same extent, the combination turbine will avoid releasing pollution into the atmosphere. In addition, if the combination turbine is fueled entirely from captive sources, as in the preferred embodiment using hydrogen and ethylene oxide, the dirt and other impurities that are taken into most prior art combustion turbines (causing wear and tear and compelling regular cleanings) is avoided, and the energy that is used by prior art combustion turbines to compress, filter and heat or cool inlet air is conserved. Furthermore, unlike solar or hydropower systems, the combination turbine of the present invention can, depending on the volume of storage for the reactants, operate on demand, as a peaking unit or as a baseload unit.

BRIEF DESCRIPTION OF THE DRAWINGS

The preferred embodiments of this invention, illustrating all its features, will now be discussed in detail. These embodiments depict the novel and non-obvious system for the geothermal production of energy of this invention shown in the accompanying drawings, which are included for illustrative purposes only. These drawings include the following figures, with like numerals indicating like parts.

DETAILED DESCRIPTION OF THE INVENTION

Figure 1:
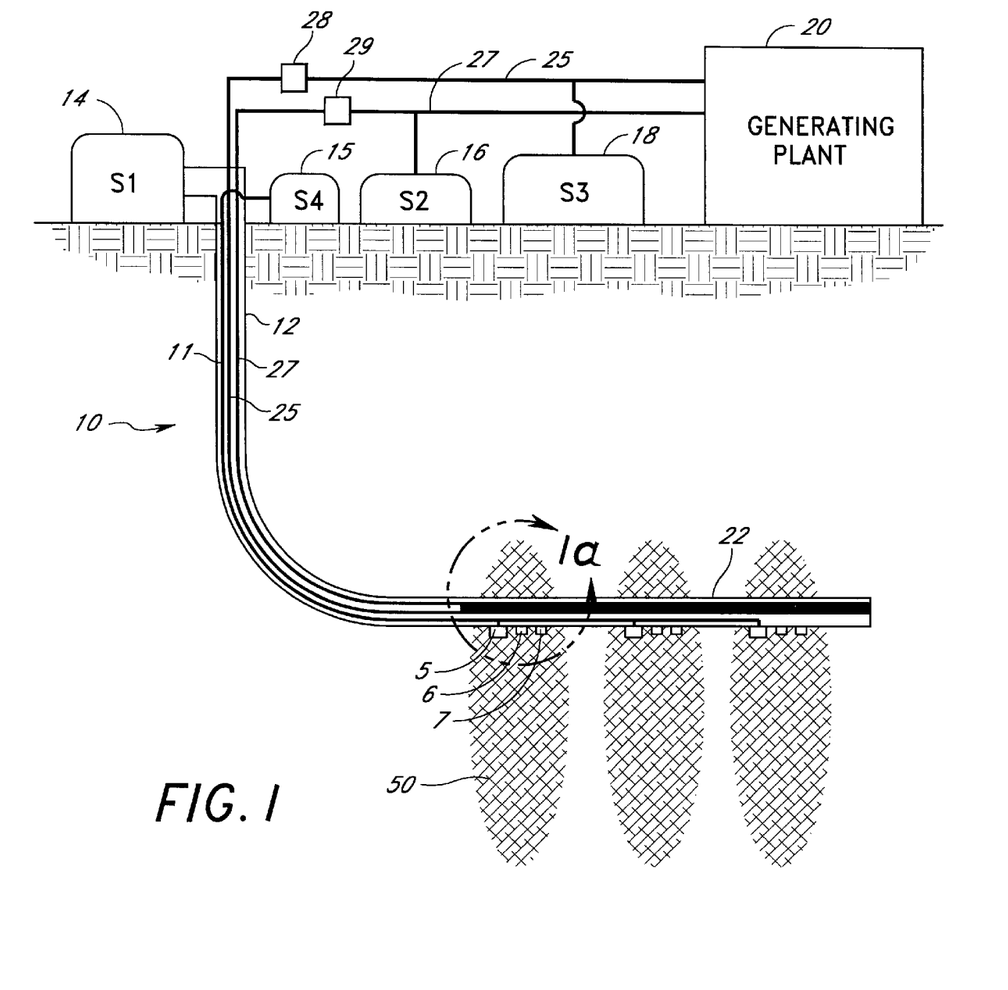
FIG. 1 is a cross-sectional schematic view of one embodiment of the system of the present invention.
Figure 1A:
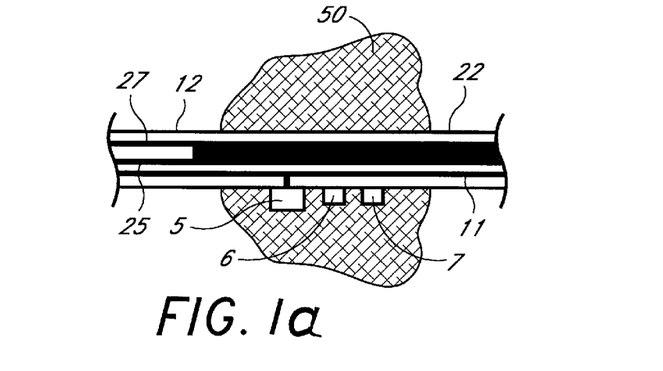
FIG. 1a is an enlarged cross-sectional schematic view of the bottom of the well of the system of the present invention as shown in FIG. 1.

FIGS. 1 and 1a illustrate the geothermal generating system 10 of the present invention. With the present invention, a viable hot, dry rock system can be efficiently used for converting geothermal heat to electricity. The present invention avoids the problems of pollutants, is less expensive, and greatly improves the operating efficiency of such geothermal systems. The system comprises a well 12 coupled to storage tank 14, shown as S1 in FIG. 1, for storing the reactants that are to be used for the endothermic reaction that occurs at the bottom of well 12, e.g., in fracture zones 50 of hot, dry rock. It is contemplated that system 10 of the present invention may also be used at other locations deep within the earth, such as reservoirs, where the geothermal heat is hot enough to induce the desired endothermic reaction. System 10 of the present invention may also be used at locations within the earth where magma is present, provided that the casing of the well is capable of withstanding the heat and other conditions in the magma. If the system 10 is used in reservoirs of brine or steam or in magma, fracture zones 50 are not required. Catalytic device 22, which catalyzes the desired endothermic reaction, resides within the bottom section of well 12, in which porous conduits 24 and 26 (shown in FIG. 6) of catalytic device 22 are coupled to standard conduits 25 and 27, respectively, which extend up through well 12. Standard conduits 25 and 27 transport the products of the endothermic reaction to the earth's surface, where the products may be cooled and condensed in condensers 28 and 29, in order to accelerate transport up the conduits 25 and 27, decrease the likelihood of condensation of the endothermic products within the well 12, and promote ease of handling of the products. The products may be stored in storage tanks 18 and 16, respectively, or delivered immediately to generating plant 20 for conversion to electricity. The endothermic reaction products are transported separately through porous conduits 24 and 26 (FIG. 6), and then through conduits 25 and 27 to a combination turbine, where, in one embodiment of the present invention, the energy is released from the products upon undergoing an exothermic reaction as will be explained in greater detail below. This energy is in turn converted to electrical energy. The high pressure at the bottom of well 12 created by a liquid column in well 12 forces the endothermic products through catalytic device 22, into porous conduits 24 and 26 (FIG. 6), and up conduits 25 and 27.

The endothermic reaction discussed in the original application, with which this continuation-in-part is copending, was the dissociation of water into hydrogen and oxygen. The dissociation of water requires very high temperatures, however, even in the presence of an effective catalyst. As a result, there are many areas where the depth of drilling needed to achieve the temperature required for that endothermic reaction is not economically attainable. In such areas, an alternative endothermic reaction having a lower temperature requirement is needed in order to make the invention operate economically. The preferred embodiment of the present invention utilizes the dehydrogenation of ethanol into hydrogen and ethylene oxide as the endothermic reaction. Palladium or copper are effective catalysts for this reaction, and would be appropriate for use in the catalytic device. The corresponding exothermic reaction, providing energy outside of the well 12, is the hydrogenation of ethylene oxide into ethanol within a combination turbine or other generating mechanism. The ethanol is condensed at the outlet of the combination turbine and ultimately returned down the well 12 for another cycle.

The dehydrogenation of ethanol, like many other endothermic reactions, is opposed by high pressure. Accordingly, if the depth of the well 12 is such that the pressure of the endothermic reactant(s) at the bottom of the well is too high for the reaction to proceed efficiently, the temperature required to cause the endothermic reaction will increase, which will require that the well be drilled still deeper. One way to avoid this result is to place the catalytic device 22 inside a capsule that is sealed against the pressure at the bottom of the well, except for an inlet device that regulates the pressure inside the capsule (as discussed below in connection with FIG. 2). The walls of the capsule are preferably designed to conduct heat quickly, so that the temperature inside the capsule would approximate the temperature outside of the capsule.

In the preferred embodiment, the endothermic reactant stored in storage tank 14 is ethanol, which is dehydrogenated to hydrogen and ethylene oxide at the bottom of well 12. Storage tank 14 maintains a column of ethanol within well 12. A separate conduit 11 coupled to storage tank 15 is also sent down to the bottom of well 12 where water or some other substance for conveying heat rapidly from conduit 11 may be released from conduit 11 to each fracture zone 50 through one-way valves 5 in the wall of well 12. To create fracture zones 50, a substance is injected into the hot, dry rock to dilate cracks and thereby access a larger volume of rock for a circulating medium. Since a percentage of the substance is lost into the fractures in the rock, the substance is resupplied to the fracture zones 50 from time to time through one-way valves 5. Pressure gauges 6 and temperature gauges 7 on the exterior of well 12 (shown in FIG. 1a), measure the pressure and temperature in fracture zones 50 so as to notify an operator when to inject such water or other substance into fracture zones 50. Conduit 11 is used with a pump (not shown) at the surface.

The endothermic reaction takes place in the lower section of the well 12, which is preferably a horizontal section. Instead of having a horizontal section, the well 12 may just be angled downward. The heat generated from fracture zones 50 raises the temperature on the casing of well 12 which correspondingly raises the temperature of the reactant within well 12. In this environment, catalytic device 22 is able to induce the endothermic reaction and separate the endothermic products.

Instead of being one continuous section as shown in FIG. 1, catalytic device 22 may be divided into a plurality of serially connected sections which are coupled together with a comparatively flexible tubing. Such a scheme is advantageous since flexible tubing, such as standard pipe for example, is less costly than a continuous section of catalytic device 22 made substantially of ceramic material, for example. Also, the flexibility is advantageous due to the need for directional drilling to access the fracture zones 50 or other heat source. Headers can be used to connect the flexible tubing to each catalytic device section where the tubing would be located in areas where the fracture zones 50 did not exist. The flexible tubing, such as pipe, should be impermeable to the endothermic products and be able to withstand high temperatures.

Figure 6:
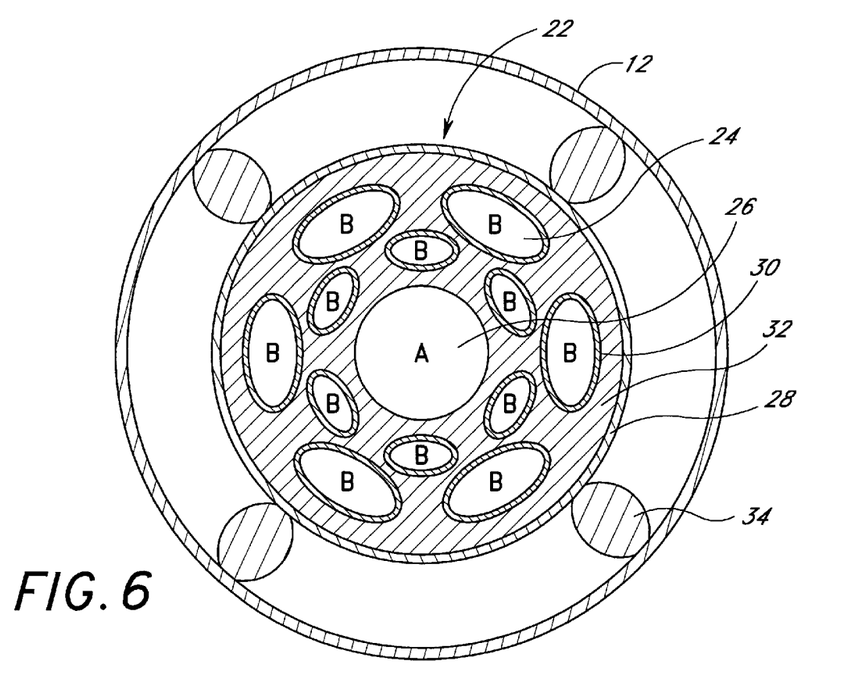
FIG. 6 is an enlarged cross-sectional view taken along line 2—2 of FIG. 1, showing the elements of the catalytic device of the system of the present invention.

Referring to FIG. 6, a cross-section of the bottom of well 12 is shown where catalytic device 22 is shown in greater detail. Catalytic device 22 is supported within well 12 by a plurality of rods 34 to allow the endothermic reactants to circulate around catalytic device 22. Rods 34 may also be knobs or any other support device as is readily understood by those of skill in the art. As shown in FIG. 6, catalytic device 22 comprises porous ceramic material 32, with porous conduit 26 substantially within the center of ceramic material 32. Ceramic material 32 is selected to have a structure that is relatively permeable to the endothermic products without encouraging the reformation of the reactants within ceramic material 32.

Substantially surrounding porous conduit 26 and within ceramic material 32 is a series of porous conduits 24. Porous conduits 24 and 26 may be either tubes or conduits and may be circular in cross-section, or of another design that is effective in collecting the products. Porous conduit 26 may be defined by a hole near the center of ceramic material 32. Porous conduits 24 are made from a material that is porous as to only one of the endothermic products. In the preferred embodiment where ethanol is dehydrogenated, porous conduits 24 are preferably made from a suitable transition metal, such as palladium, which is porous to hydrogen, but not ethylene oxide. Porous conduit 26 is labelled in FIG. 6 by the letter A to represent that porous conduit 26 receives endothermic product A, and porous conduits 24 are labelled by the letter B to represent that porous conduits 24 receive endothermic product B. In a preferred embodiment, product A may be ethylene oxide, for example, and product B may be hydrogen.

Thin film or mesh catalyst 28 (FIG. 6) on catalytic device 22 is provided at the bottom of well 12 to accelerate the series of reactions producing the hydrogen and ethylene oxide. Thus, the ethanol at the bottom of well 12 reacts with the catalyst 28 on the surface of catalytic device 22. Ceramic material 32 is designed to be permeable to the endothermic reaction products so that the products will diffuse to their respective porous conduits 24 and 26. Porous conduit 24 and 26 are assembled within ceramic material 32 to promote the separation of the products by absorbing them upon formation on catalyst 28.

As shown in FIG. 6, each porous conduit 24 is made from a selective material 30 which has the property of being porous only with respect to product B. Thus, product B of the endothermic reaction permeates ceramic material 32 and is collected by the series of porous conduits 24 after product B diffuses through selective material 30. Since selective material 30 is specifically designed to block the entry of product A, as product A diffuses through ceramic material 32, product A maneuvers around the locations of selective material 30 and through the passages between the series of porous conduits 24 until product A diffuses into porous conduit 26. As a result, the products A and B of the endothermic reaction are kept separate in their respective conduits, 26 and 24. Some of product B may, in fact, diffuse past porous conduits 24 and eventually into porous conduit 26 where this amount of product B reacts with product A. This reaction does not have any significant deleterious effect on the system. In the case of the dehydrogenation of ethanol, for example, porous conduit 26 is filled with ethylene oxide and a small amount of ethanol vapor that can be removed at the surface.

Figure 3:
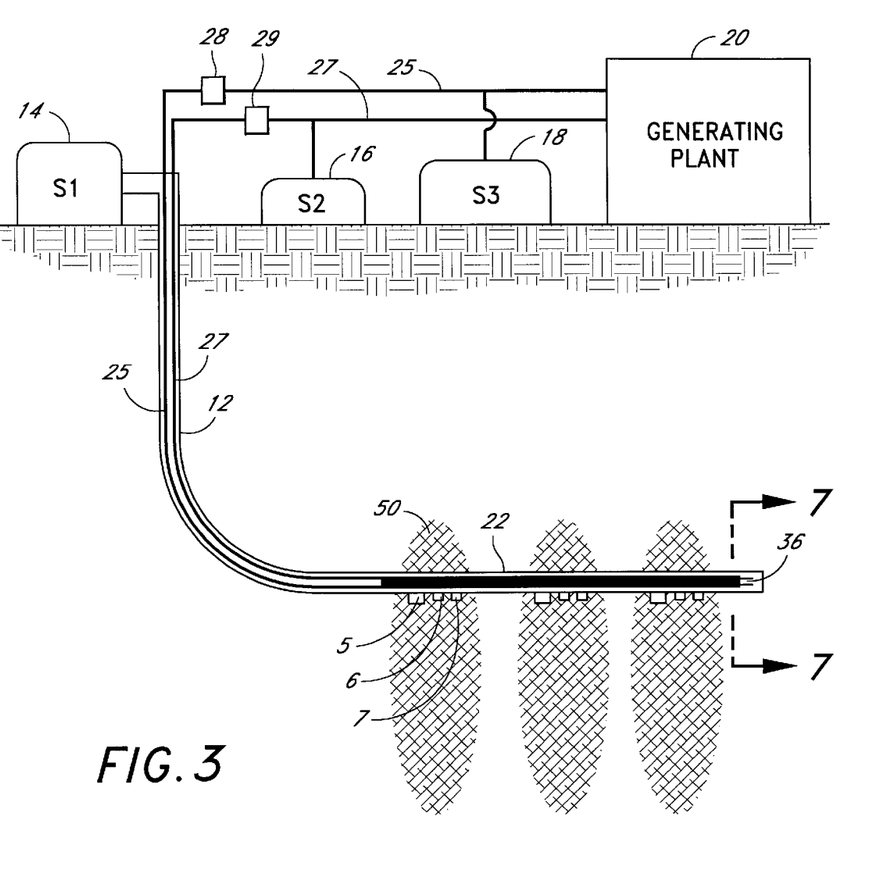
FIG. 3 is a cross-sectional schematic view of a first alternate embodiment of the system of the present invention.
Figure 7:
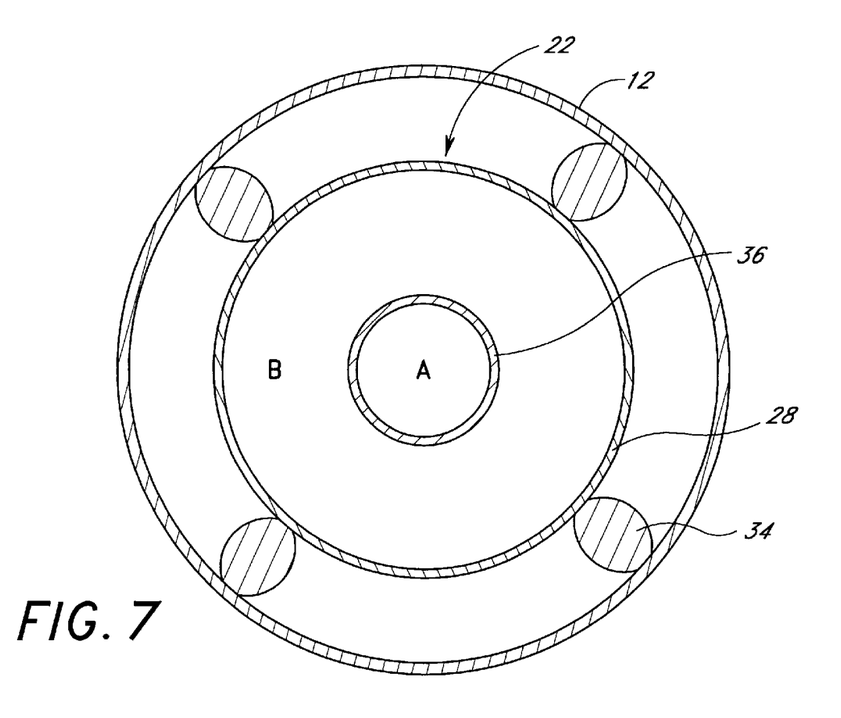
FIG. 7 is an enlarged cross-sectional view taken along line 7—7 of FIG. 3, showing an alternate embodiment of the catalytic device of the system of the present invention.

An alternate embodiment of the system of the present invention is illustrated in FIG. 3, where an alternate catalytic device 22 is employed. Notwithstanding the embodiment illustrated in FIG. 3, the horizontal section of well 12 may be angled downward. In FIG. 3, catalytic device 22 is shown to have an open-ended tube 36 extending out from the end of catalytic device 22. Open-ended tube 36 extends through catalytic device 22 and is coupled to standard conduit 27 through a header (not shown). The alternate embodiment of catalytic device 22 is shown in detail in cross-section in FIG. 7. As in the preferred embodiment, catalytic device 22 is supported in the middle of well 12 by a plurality of support rods or knobs 34. Catalytic device 22 comprises a hollow conduit made of catalyst 28, and substantially near the center of catalyst 28 is extended tube 36. In the preferred case of dehydrogenating ethanol, catalyst 28 is made from palladium or another substance for absorbing hydrogen into the hollow conduit. The ethylene oxide is unable to diffuse through the tube 36 and continues to drift to the end of the well where the ethylene oxide eventually enters the open end of extended tube 36 as does ethanol. The ethylene oxide and ethanol are pumped back up to the surface through extended tube 36 and then standard conduit 27. The ethanol is separated out of the mixture before going to a turbine to undergo the exothermic reaction. Such separation may be accomplished by conventional means readily known to those of skill in the art. The hydrogen that diffuses through the catalyst 28 rises to the surface through the hollow portion of the catalyst and then standard conduit 25 due to the high pressure at the bottom of well 12.

Catalytic device 22 provides two important functions: it harvests and separates the endothermic products, and also removes the products from the reservoir. A number of substances may catalyze the endothermic reaction. However, the products of the reaction are likely to readily recombine into the reactant(s) under the conditions existing in the well. In addition, the products of the endothermic reaction may be sufficiently reactive, especially at elevated temperatures, to react with the walls of the well or otherwise react in an undesirable manner once they escape from the surface of the catalyst. The products must therefore be collected and separated. Moreover, to the extent that the endothermic reaction provides more moles of product than it consumes moles of reactant, the reaction will be opposed by the high pressure environment that exists in the well. During operation, well 12 is preferably a column of ethanol which creates very high pressure at the bottom of the ethanol column. This pressure is a major impediment to the endothermic reaction at the bottom of the well, which is typically at a significant depth and at an elevated temperature, causing the pressure to be increased significantly. Because catalyst 28 is permeable to the endothermic products, however, the very high pressure forces the endothermic products up to the earth's surface through porous conduits 24 and 26, and then conduits 25 and 27. Thus, devices such as pumps may not be required to transport the products up to generating plant 20, although they can be used.

Figure 2:
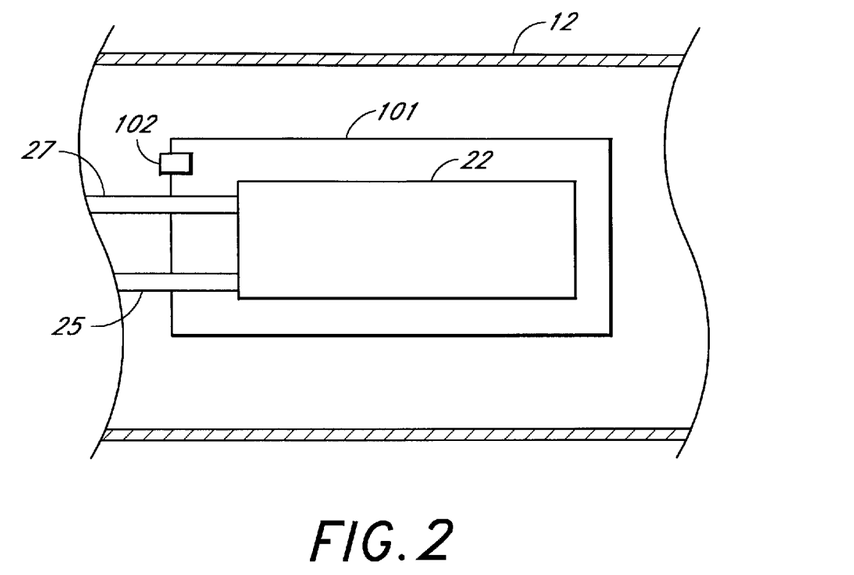
FIG. 2 is a cross-sectional schematic view of one embodiment of the present invention illustrating a means of enclosing the catalytic device in a capsule.

FIG. 2 illustrates the catalytic device 22 inside of a capsule, 101, which maintains the endothermic reactant at a lower pressure than is present in the well 12, thus permitting the endothermic reaction to proceed more rapidly. The capsule 101 is sealed around inlets of the conduits 25 and 27, so that the only point of ingress for the exothermic reactant is the inlet device 102, which contains a pressure sensor for determining the pressure inside the capsule 101 and a valve for restricting the admission of additional endothermic reactant as needed to maintain the predetermined pressure within the capsule 101.

Figure 2A:
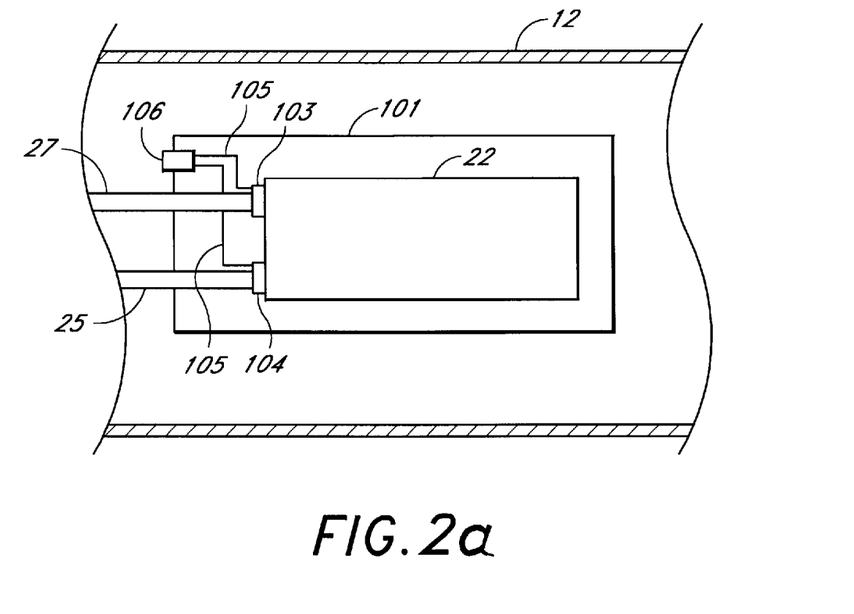
FIG. 2a is a cross-sectional schematic view of an alternate means of enclosing the catalytic device in a capsule.

FIG. 2A illustrates the use of the capsule 101 to limit the pressure around the catalytic device 22, together with compressors 103 and 104 to raise the pressure of the endothermic products in conduits 27 and 25, respectively. If the pressure of the reactant at the outside surface of the catalytic device 22 is lowered by the capsule 101, the pressure of the product(s) inside the catalytic device might be too low for efficient and effective transport up the conduits 27 and 25 to the surface. Inlet device 106 of capsule 101 includes a pressure sensor for determining the pressure inside the capsule 101 and a turbine or other device for harnessing the energy of the higher pressure outside of the capsule as the reactant is "let down" into the capsule. This turbine or other device is linked by mechanical or electrical connections 105 to supply power to the compressors 103 and 104 located inside the catalytic device 22 or the conduit(s) 27 and 25 compressors 103, 104 then pressurize the product(s) for more efficient transport up the conduits 27 and 25. Alternately, power may be supplied to the compressors 103 and 104 from an external source (not shown).

Figure 4:
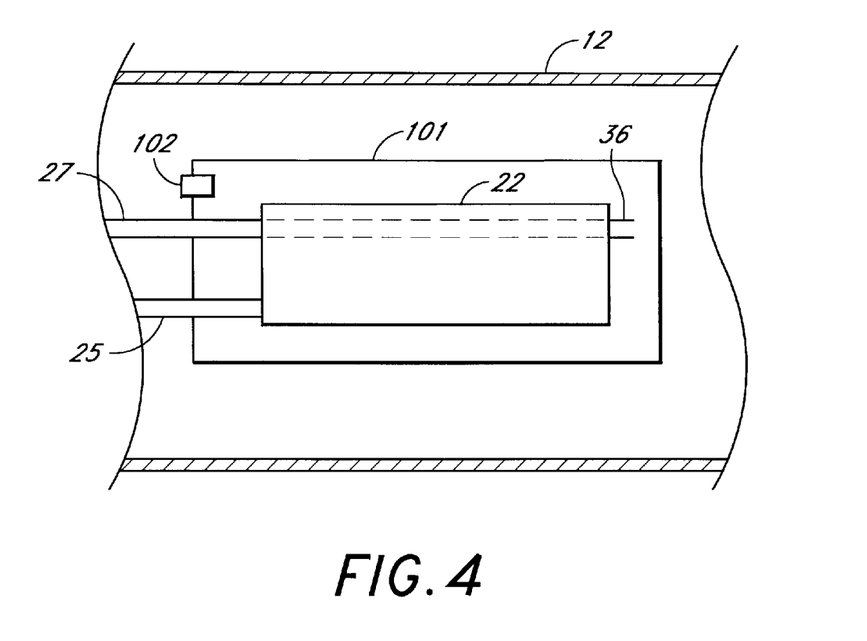
FIG. 4 is a cross-sectional schematic view of another alternate means of enclosing the catalytic device in a capsule.
Figure 4A:
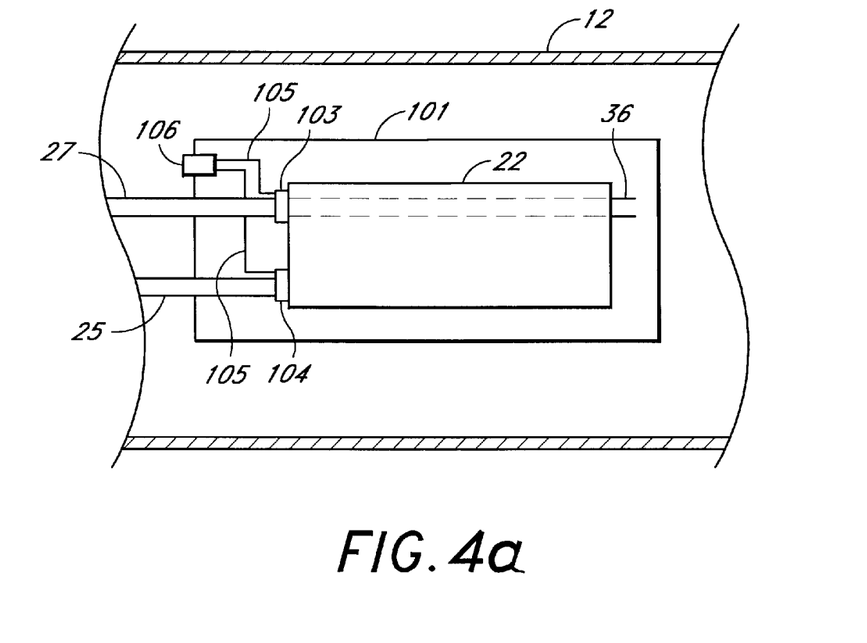
FIG. 4a is a cross-sectional schematic view of another alternate means of enclosing the catalytic device in a capsule.

FIG. 4 illustrates the use of the capsule 101 to maintain lower pressure in the alternate embodiment of system 10 in which one of the products is permitted to flow to an open-ended tube 36, as shown in FIG. 3. Wherever the catalytic device 22 is inside the capsule 101, the open-ended tube 36 inside the catalytic device 22 is also inside the capsule 101. The inlet device 102 in FIG. 4 functions similarly to that of the inlet device 102 in FIG. 2. FIG. 4a illustrates the use of the capsule 101 and compressors 103 and 104 in the alternate embodiment of the system 10 in which one of the products is permitted to flow to an open-ended tube 36. Again, the open-ended tube 36 will be inside the capsule 101. The compressors 103 and 104, the connections 105 and the capsule's inlet device 106 function similarly to those of FIG. 2a.

Figure 5A:
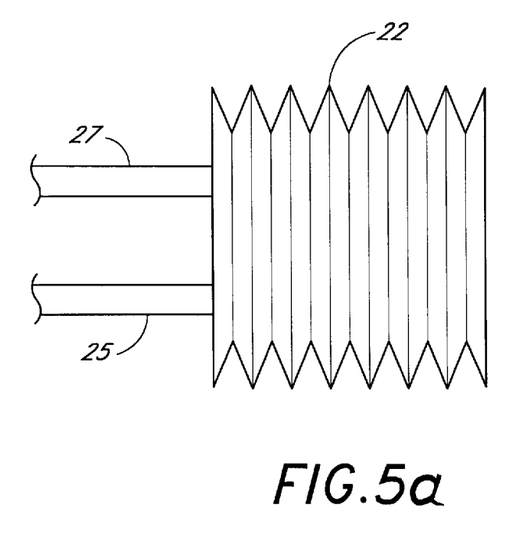
FIG. 5a is an elevational view of a means of enlarging the catalytic surface area of the catalytic device without enlarging its length or diameter.
Figure 5B:
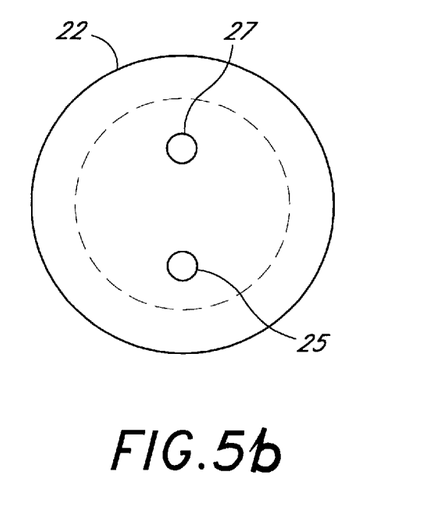
FIG. 5b is an end view of the embodiment shown in FIG. 5A.
Figure 5C:
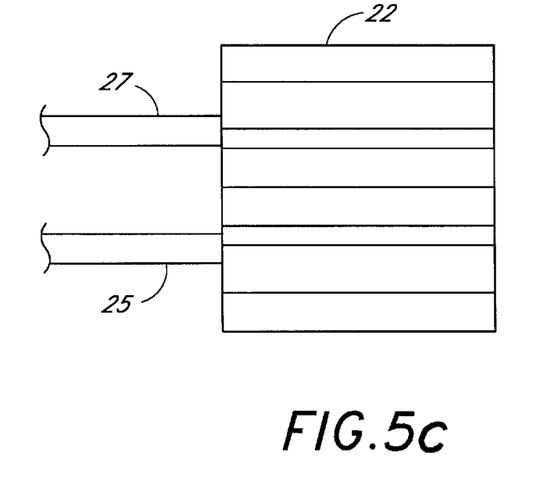
FIG. 5c is an elevational view of an alternate means of enlarging the surface area of the catalytic device without enlarging its length or diameter.
Figure 5D:
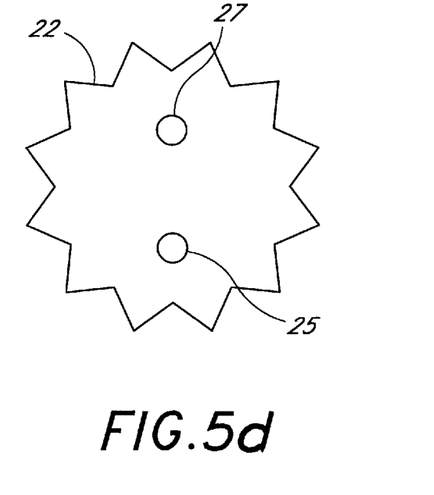
FIG. 5d is an end view of the embodiment shown in FIG. 5C.

FIGS. 5a and 5b illustrate an alternative embodiment of the catalytic device 22. The surface area of the catalyst 28 can be increased without increasing the length of the catalytic device 22 or the well 12 by choosing a catalytic device 22 having a shape other than a smooth cylinder. In FIGS. 5c and 5d, additional surface area is achieved with circumferential ridges and indentations in the outer wall of the catalytic device 22, in which the ridges and indentations increase the turbulence around the catalytic device, thus increasing the likelihood that unconverted endothermic reactant encounters the catalytic surface. FIGS. 5A and 5B illustrate an alternative embodiment, in which the increased surface area is achieved with longitudinal ridges and indentations in the outer wall, which allows for a smoother, more direct flow than does the configuration of FIGS. 5A and 5B.

A significant advantage of relying on endothermic reactions in system 10 of the present invention over existing prior art geothermal systems is that system 10 absorbs a greater amount of heat per unit volume through the endothermic reaction than can be captured by the heated brine or steam. For example, the dehydrogenation of a given number of moles of ethanol captures several times the amount of heat that is represented by the same number of moles of steam. Thus, higher temperatures are achieved which improves the efficiency of the exothermic reaction in the turbine and the subsequent generation of electricity.

Additionally, the present invention requires only one well in contrast to the two wells required in many prior art schemes. The endothermic reactants may be transported in the same well as the endothermic products since there is no danger that the reactants and products will interact. This is in contrast to previous systems where the injected water could not be transported in the same well as the rising steam, since the steam would lose heat to the water, thereby reducing the system's efficiency. Moreover, the one well used in the present invention is less expensive to drill, since the products of the endothermic reaction convey the energy in a comparatively much smaller volume than the steam or brine relied on by past geothermal systems. For example, in previous one-well systems for capturing steam or brine from a reservoir, the cross-sectional diameter of the production well may be 36 inches. Because the present system may require approximately six times less space, the cross-sectional diameter of the well of the present invention may require, for example, only 12 inches—6 inches for injecting the water, and another 6 inches for transporting hydrogen and oxygen.

Figure 8:
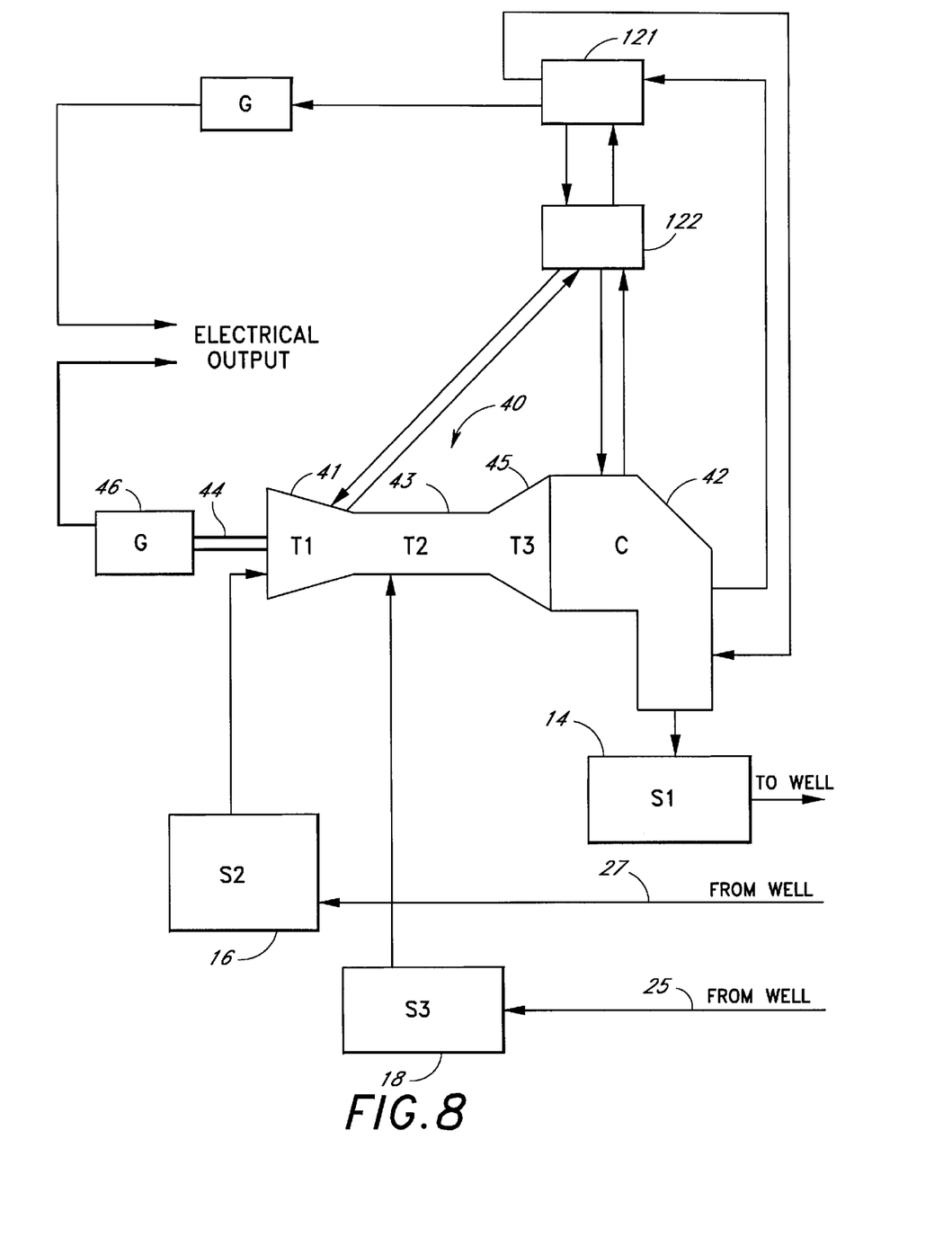
FIG. 8 is a schematic view of the combination turbine used in the system of the present invention.
Figure 9:
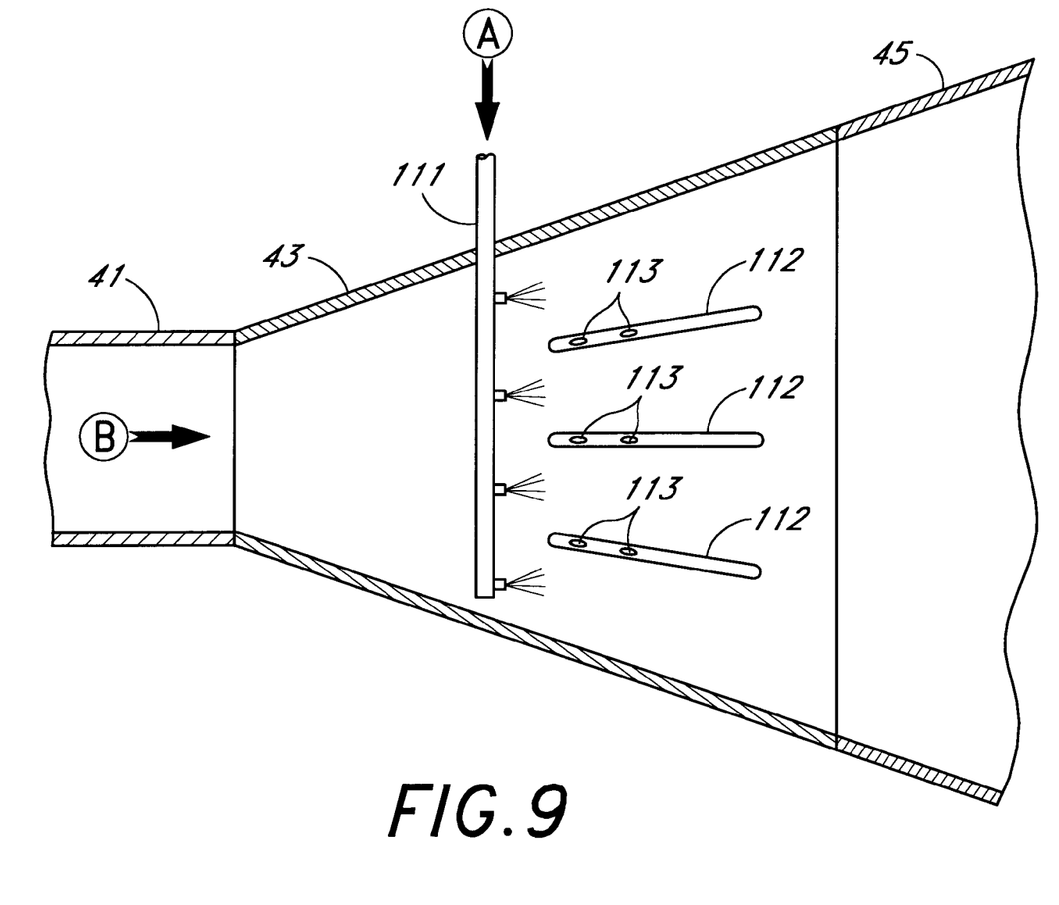
FIG. 9 is an enlarged cross-sectional view of one embodiment of the reactor stage of the combination turbine.

Referring to FIG. 8, a schematic of a combination turbine 40 which produces the exothermic reaction to release the geothermal heat is illustrated. Combination turbine 40 comprises turbine compressor stage 41, turbine fuel injector and reactor stage 43, turbine power stage 45, and condenser 42. Turbine stages 41 and 45 and condenser 42 may be advantageously constructed in a conventional manner as understood by those of ordinary skill in the art and optionally modified to optimize the performance of the system 10, depending upon the exothermic reaction. For example, the exothermic reactant in the compressor stage 41 may be cooled, the power stage 45 may have additional stages and the condenser 42 may be part of a second, "binary" power system. In a preferred embodiment, the reactor stage 43 is not a combustion chamber in the customary fashion, but is instead a chamber into which the compressor stage 41 feeds compressed hydrogen, and into which liquid ethylene oxide is injected, in such a manner that the reactants contact catalytic surfaces within the reactor stage 43, as illustrated in FIG. 9 and discussed below. Combination turbine 40 is coupled to generator 46 by generator shaft 44 where the mechanical energy of the rotating generator shaft 44 is converted into electricity in generator 46.

Turbine compressor stage 41 receives exothermic reactant B, which is product B from the endothermic reaction, from storage tank 18 or directly from well 12 through conduit 25. Depending on the type of exothermic reactant B (endothermic product B), the reactant B may not need to be compressed, and thus the compressor stage 41 may not be required. In the preferred embodiment, exothermic reactant B is hydrogen. Since the hydrogen coming from well 12 is already compressed due to the pressure in well 12, the hydrogen may be sufficiently compressed to reduce or eliminate the need for compressor stage 41. Reactant B may be cooled prior to the inlet to the reactor stage 43, in order that the maximum temperature achieved in the reactor stage 43 will represent a larger difference in the temperature of the reactants and their products. Turbine fuel injector and reactor stage 43 receives exothermic reactant A, which is product A from the endothermic reaction, from storage tank 18, or directly from well 12 through conduit 27. In the preferred embodiment, exothermic reactant A is ethylene oxide.

FIG. 9 illustrates the interior of the reactor stage 43. Reactant B enters the reactor stage 43 from the compressor stage 41, while Reactant A is injected into the reactor stage 43 through one or more fuel injection devices 111. The reactants encounter catalytic surfaces 112 which are designed and positioned to maximize contact between the reactants and the catalytic surfaces without adversely interfering with the reactant flow. To the extent that the reactants enter the reactor stage 43 at a temperature below the optimal temperature to begin the exothermic reaction, the optimal temperature and the commencement of the exothermic reaction is achieved by heating the areas of the catalytic surfaces 112 nearest the injection devices 111 with heating elements 113 that are embedded in the catalytic surfaces 112. The preferred source of the heat for the heating elements is the excess heat of the exothermic product after it leaves the power stage 45 (although a source of heat external to the system 10 is initially required when the turbine 40 is started, until the temperature of the turbine has increased sufficiently). The exothermic reaction itself generates heat and therefore heating elements 113 are not necessary in those areas of the reactor stage 43 where the exothermic reaction increases the temperature to the extent necessary to cause the reaction to proceed spontaneously. In the reactor stage 43, exothermic reactants A and B, e.g., ethylene oxide and hydrogen, respectively, react in the presence of catalyst 112, to create a great amount of heat and produce ethanol. The resulting energy released by the exothermic reaction is harnessed to turn blades within power stage 45 which in turn, rotates generator shaft 44. After the exothermic product has passed through turbine power stage 45, the exothermic product is immediately condensed in condenser 42 where the exothermic vapor product is changed to liquid. The efficiency of the turbine 40 is improved by condensing the exothermic product to remove the back pressure from turbine 40. The condensing of the exothermic product may be accomplished by means known to those of ordinary skill in the art. In a preferred embodiment, the vapor is condensed to liquid, which is inserted into endothermic reactant storage tank 14 for reintroduction of the ethanol into well 12.

By combining combustion turbine 40 with condenser 42, the combination turbine of the present invention achieves a higher efficiency than prior art combined cycle combustion turbines where a steam turbine is also used in conjunction with a combustion turbine and a condenser. In a preferred embodiment of the present invention, efficiency is increased since the combination turbine does not require a heat exchanger to convert the heat of the exothermic product to vapor. In past systems, the arrangement of the combination turbine of the present invention could not be employed since the exothermic product of prior art turbines is a largely non-condensable pollutant as opposed to the condensable vapor produced in the combination turbine of the present invention.

The heat remaining in the exothermic product at the outlet of the turbine 40 must be removed in order to cause the exothermic product to condense. The standard method for removing heat in a steam turbine is to capture the heat in a cooling liquid, through a heat exchanger, and then "reject" the heat into the environment by passing the cooling liquid through a cooling tower or radiator. In a preferred embodiment of the present invention, a cooling liquid is used to collect the heat from the condenser 42 (and optionally from other sources, such as the compressor stage of turbine 40), but the cooling liquid will have a boiling point lower than the temperature of the exothermic product as it enters the condenser so that the fluid vaporizes and will be the working fluid for a second, or "binary", turbine 121 (FIG. 8) that, like a standard steam turbine, drives a generator and produces additional power. The environmental effects and expense of the usual heat rejection system (including the use, contamination and evaporation and/or disposal of water, in the case of a cooling tower) are decreased substantially, although not necessarily eliminated entirely. The overall efficiency of the system is increased because the residual heat from the combination turbine is converted into power instead of being "rejected." The capital and operating expense of the second, "binary" turbine 121 is offset to some extent by the decreased capital and operating expense of the heat rejection system, and by the value of the additional energy produced.

A preferred embodiment incorporates an absorption chilling system 122 (FIG. 8). The absorption chilling system 122 utilizes some of the heat from the condenser 42 that condenses the exothermic product and utilizes heat from other sources of unneeded heat (such as the compressor stage 41 of the combination turbine 40) to provide chilling for: the working fluid in the second, "binary" turbine 121, one or both of the condensers 28 and 29 at the outlet of the well 12, one or more of the exothermic reactants entering the turbine 40, and/or the exothermic product of the turbine 40, to ensure that it is condensed. The heat that the absorption chilling system 122 must dispose of is fed into the condenser 42 at the outlet of the combination turbine 40, thus providing additional energy for the second, "binary" generating turbine 121.

To the extent that condensation creates a closed loop system where all of the exothermic product is condensed or otherwise captured, it is possible to make productive use of some of the energy that is lost in prior art systems with the exhaust, thus further increasing efficiency. To the same extent, the combination turbine of the present invention avoids releasing pollution into the atmosphere, in contrast to prior art systems. Also, because in a preferred embodiment, the combination turbine 40 is fueled by hydrogen and ethylene oxide which are from captive sources, dirt and other impurities that are taken into most combustion turbines from the air is avoided. Since the present invention relies on the endothermic products for conveying the geothermal heat, the products can be stored for use at a later time in contrast to prior art geothermal systems where the captured steam or brine had to be utilized immediately. Due to this advantage, the combination turbine of the present invention has the added flexibility of operating as a peakload unit to be turned on and off on demand, or as a baseload unit which functions continuously.

Alternatively, the system of the present invention may be used with a conventional combustion turbine, or a boiler with a steam turbine, or the products of the endothermic reaction might be used in a fuel cell. In addition, the combination of a second, "binary" turbine 121 with an absorption chilling system 122 can be used as an additional source of power, and a cooling system for a conventional combustion turbine or a boiler with a steam turbine.

It will be further apparent that the products of the endothermic reaction such as, for example, hydrogen and ethylene oxide, are of value and the invention can be used to harvest these products and store them at the surface of the well for uses other than producing electricity.

Further, the invention has utility in environments other than the geothermal well and is useful in any environment, natural or man-made, having suitable temperature and pressure.

SCOPE OF THE INVENTION

The above represents a description of the best mode contemplated of carrying out the present invention, and of the manner and process of making and using it, in such full, clear, concise, and exact terms as to enable any person skilled in the art to which it pertains to make and use the invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed in the following claims, which particularly point out and distinctly claim the subject matter of the invention.

What is claimed is:

1. A system for capturing and utilizing geothermal heat using endothermic reactions and releasing the heat through exothermic reactions to produce electricity comprising:

a well having a top and a bottom, where said well is drilled to a sufficient depth to acquire sufficient geothermal heat to promote the endothermic reaction of dehydrogenating ethanol, a catalytic device residing within the bottom of said well, said catalytic device for harvesting and separating hydrogen and ethylene oxide, the products of said endothermic reaction;

a supply of said ethanol;

means for supplying said ethanol from the top of said well to said catalytic device;

a first chamber within said catalytic device having walls which are substantially porous to said first product of said endothermic reaction and substantially impermeable to a second product of said endothermic reaction;

a second chamber within said catalytic device having walls which are substantially porous to said second product of said endothermic reaction;

first and second conduits respectively coupled to said first and second chambers for transporting the gaseous products of the endothermic reaction to the top of said well, the high pressure environment within said well at the depth of said catalytic device being utilized to force said gaseous products through said catalytic device and through said first and second conduits to the top of said well; and a combination turbine coupled to said first and second conduit for using the products of the endothermic reactions to create exothermic reactions for generating electricity.

2. The system of claim 1, further comprising an open ended tube that passes through and extends beyond said catalytic device, said open ended tube transporting any remaining endothermic product and any residual endothermic reactant to one of said conduits for return to the surface of the earth.

3. A system for capturing geothermal heat using endothermic reactions and releasing the heat through exothermic reactions to convert to electricity comprising:
 a supply of ethanol;
 a well having a top and a bottom, where said well is drilled to a sufficient depth to acquire geothermal heat through the endothermic reaction when ethanol is inserted into said well;
 a catalytic device residing within the bottom of said well, said catalytic device for harvesting and separating the products of said endothermic reactions;
 a first and second conduit for transporting the products of the endothermic reaction to the top of said well; and
 a means coupled to said first and second conduits for using the products of the endothermic reactions to create exothermic reactions to generate power.

4. The system of claim 3, wherein said system further comprises a storage device coupled to said first conduit for storing a first product of the endothermic reactions.

5. The system of claim 3, wherein said system further comprises a second storage device coupled to said second conduit for storing a second product of the endothermic reactions.

6. The system of claim 3, wherein said means coupled to said first and second conduits comprises a combustion turbine coupled to a condenser.

7. The system of claim 6, wherein said turbine further comprises a compressor coupled to the inlet of said turbine.

8. The system of claim 6, wherein the output of said condenser is coupled to a third storage tank.

9. The system of claim 3, wherein said catalytic device comprises a catalyst porous to both first and second products of the endothermic reactions, a first porous conduit within said catalyst for receiving the first product, a second porous conduit within said catalyst for receiving the second product, and a selective material surrounding said second porous conduit where said selective material is porous only to the second product.

10. The system of claim 3, wherein said catalytic device comprises a catalyst porous only to a first product of the endothermic reactions, a first porous conduit within said catalyst for receiving the first product, at least one second porous conduit attached to said catalyst for receiving said second product, and a selective material surrounding said second porous conduit where said selective material is porous only to the second product.

11. The system of claim 3, wherein said catalytic device comprises a catalyst porous only to a first product of said endothermic reaction, and a return conduit extending beyond the end of said catalytic device to retrieve the remaining products of said endothermic reaction, said return conduit impermeable to said first product.

12. The system of claim 3, wherein the endothermic reaction is the dehydrogenation of ethanol and the products of said reaction include hydrogen and ethylene oxide.

13. The system of claim 3, wherein said well is coupled to a third storage tank for storing said reactants of said endothermic reaction.

14. The system of claim 3, wherein the endothermic reaction is the dehydrogenation of ethanol into ethylene oxide and hydrogen, and the exothermic reaction is the hydrogenation of ethylene oxide into ethanol.

15. The system of claim 3, further comprising an open ended tube that passes through and extends beyond said catalytic device, said open ended tube transporting any remaining endothermic product and residual endothermic reactant to one of said conduits for return to the surface of the earth.

16. The system of claim 3, further comprising a capsule that surrounds said catalytic device to reduce the pressure of the endothermic reactants at said catalytic device so that the endothermic reaction is promoted.

17. The system of claim 16, wherein energy available from a decrease in the pressure of the reactant entering said capsule is used to compress the endothermic products.

18. The system of claim 3, wherein a substance is injected into fracture zones in rock containing geothermal heat to more efficiently extract the geothermal heat.

19. The system of claim 3, wherein the surface of said catalytic device is formed to increase the surface area of said catalytic device to increase net reaction rates.

20. A catalytic device for harvesting products of the dehydrogenation of ethanol comprising:
 a catalyst for inducing an endothermic reaction, where said catalyst is porous to at least one of the products of the endothermic reaction;
 a first and second porous conduit in contact with said catalyst for harvesting and separating the first and second products of the endothermic reaction; and
 a selective material surrounding said second porous conduit where said selective material is porous only to the second product.

21. The device of claim 20, wherein said first and second porous conduits reside within said catalyst.

22. A combination turbine for use in a system for the geothermal production of electricity wherein the geothermal heat produces ethylene oxide and hydrogen from ethanol at the bottom of a well at a depth at which said geothermal heat is sufficient to cause the endothermic reaction of dehydrogenation of said ethanol, comprising:
 a combustion turbine comprising a first inlet with said ethylene oxide flowing therethrough and a second inlet with said hydrogen flowing therethrough, said turbine being driven by energy released by an exothermic reaction between said ethylene oxide and hydrogen; and
 a condenser coupled to said combustion turbine for condensing the product of said exothermic reaction to reduce the back pressure at the output of said combustion turbine.

23. The combination turbine of claim 22, including a reaction chamber wherein the exothermic reaction occurs.

24. The combination turbine of claim 23 wherein the exothermic reactants are cooled prior to entering said reaction chamber.

25. The combination turbine of claim 23, wherein said reaction chamber comprises catalytic elements to promote the exothermic reaction.

26. The combination turbine of claim 25, wherein portions of said catalytic elements near an inlet of said reaction chamber are heated to promote the exothermic reaction.

27. The combination turbine of claim 22, wherein coolant in said condenser forms a vapor within said condenser that drives a second, "binary" turbine.

28. The combination turbine of claim 27, wherein heat from said combination turbine is a heat source for an absorption chiller, said chiller supplying chilled coolant to said second, "binary" turbine.

29. The combination turbine of claim 22, wherein said combination turbine further comprises a compressor coupled to the inlet of said combustion turbine.

30. The combination turbine of claim 22, wherein the products received by said combustion turbine are hydrogen and ethylene oxide, said hydrogen and ethylene oxide being converted to ethanol.

31. The combination turbine of claim 22, wherein said condenser converts said ethanol vapor to liquid ethanol and returns said liquid ethanol to the system.

32. A method of capturing geothermal heat using endothermic reactions comprising the steps:

inserting ethanol into a well, said well being a sufficient depth to acquire geothermal heat through endothermic reactions;

performing an endothermic reaction in said well using the ethanol brought from the surface of said well; and retrieving the products of said endothermic reactions to the surface of said well.

33. The method of claim 32, further comprising the step of performing the exothermic reaction of hydrogenating ethylene oxide into ethanol.

34. A system for capturing geothermal heat using endothermic reactions comprising:

a supply of ethanol;

a well having a top and a bottom, where said well is drilled to a sufficient depth to acquire geothermal heat through the endothermic reactions when said ethanol is inserted into said well;

a catalytic device residing within said well, said catalytic device for harvesting and separating the products of said endothermic reactions;

a conduit for transporting the product of the endothermic reaction to the top of said well; and a means coupled to said conduit for harnessing the product of the endothermic reaction.

* * * * *